United States Patent

Bings et al.

[11] 4,361,541
[45] Nov. 30, 1982

[54] METHOD FOR EXTRACTION OF URANIUM FROM ORES

[75] Inventors: Hubert Bings; Fritz Kampf, both of Lunen; Roland Thome, Bonn; Gerhard Wargalla, Lunen; Gunter Winkhaus, Konigswinter; Hartmüt Pietsch, Bad Homburg von der Hohe; Wolfgang Türke, Schoneck; Peter Fischer, Bad Vilbel, all of Fed. Rep. of Germany

[73] Assignees: Vereinigte Aluminium-Werke Aktiengesellschaft, Bonn; Metallgesellschaft Aktiengesellschaft, Frankfurt am Main, both of Fed. Rep. of Germany

[21] Appl. No.: 72,176

[22] Filed: Sep. 4, 1979

[30] Foreign Application Priority Data

Sep. 20, 1978 [DE] Fed. Rep. of Germany ....... 2840818

[51] Int. Cl.³ .................. C01G 43/01; B01D 11/02
[52] U.S. Cl. .................................. 423/20; 75/101 R; 266/101; 422/208; 423/3
[58] Field of Search .............. 423/3, 18, 20; 75/101 R; 422/208, 295; 266/101, 121

[56] References Cited

U.S. PATENT DOCUMENTS

| | | | |
|---|---|---|---|
| 3,273,972 | 9/1966 | Campbell et al. | 423/18 |
| 3,450,526 | 6/1969 | Davis | 75/101 R |
| 3,488,162 | 1/1970 | Sierzputowski | 423/20 |
| 3,497,317 | 2/1970 | Tusche | 423/123 |
| 3,637,371 | 1/1972 | Mackiw et al. | 75/101 R |
| 3,958,947 | 5/1976 | Robinson et al. | 75/101 R |

FOREIGN PATENT DOCUMENTS 2001611 2/1979 United Kingdom ............ 423/18

OTHER PUBLICATIONS

Galkin et al., Eds, *Technology of Uranium* AEC-tr-6638, (1966) p. 121.

Primary Examiner—Deborah L. Kyle
Attorney, Agent, or Firm—Darby & Darby

[57] ABSTRACT

A method for continuously extracting uranium from ores comprises the steps of forming a slurry of ore in a leaching solution; heating the slurry while pumping it through a tube reactor at high turbulences characterized by Reynolds numbers in excess of 50,000; supplying gaseous oxygen at high pressures of at least 30 bar into the tube reactor such that the uranium is substantially completely oxidized in a soluble form but impurities in the slurry are substantially kept from becoming soluble; recovering the uranium oxide solute which is substantially free of impurities.

14 Claims, 2 Drawing Figures

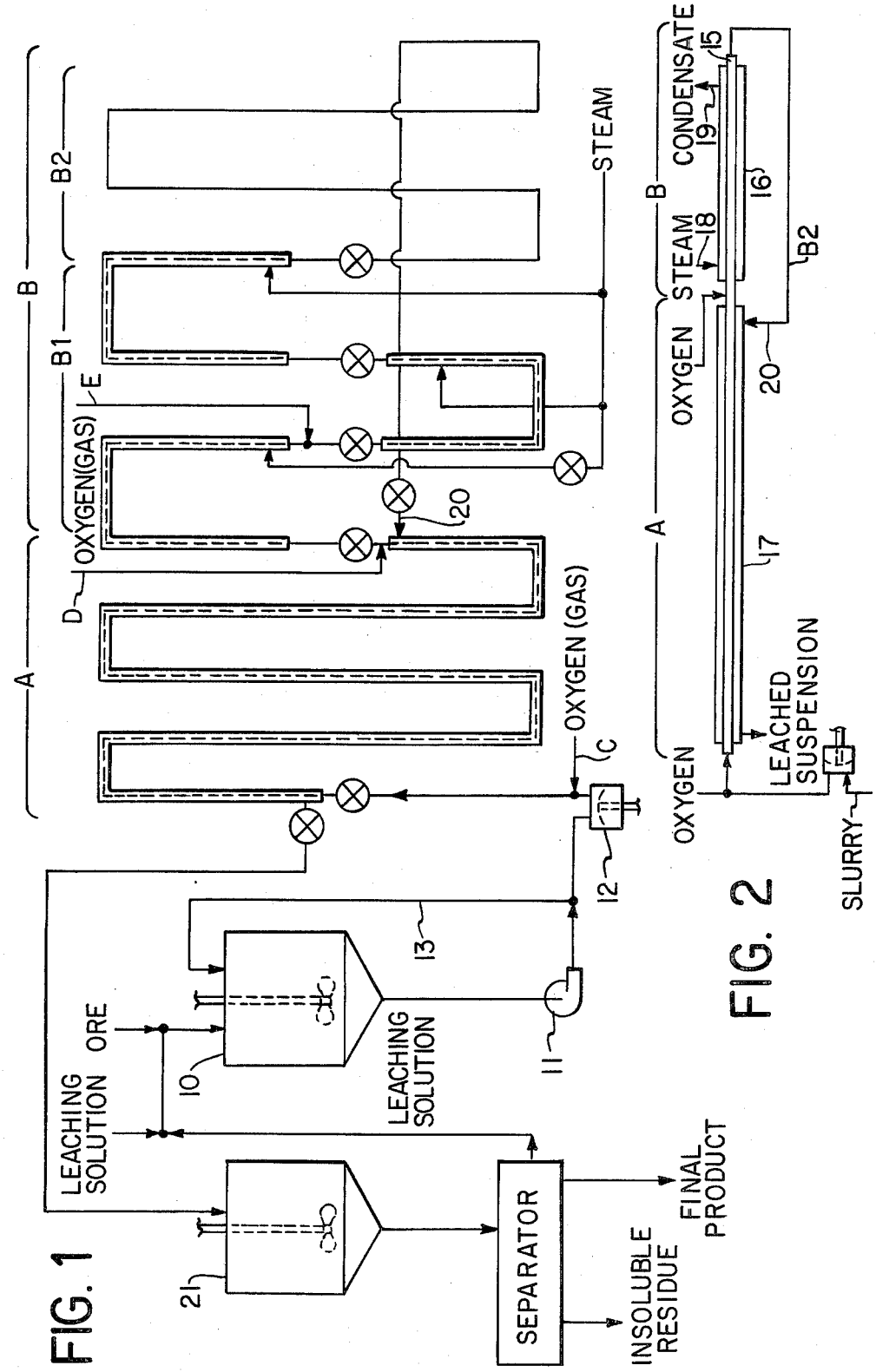

METHOD FOR EXTRACTION OF URANIUM FROM ORES

BACKGROUND OF THE INVENTION

The present invention relates to an improved process for extracting uranium from ores by pressure leaching or lixivation. More particularly, the invention is directed to pressure leaching under high temperature and pressure conditions and oxidation with gaseous oxygen in order to extract a uranium product at high yields and of a high degree of purity. The invention has particular importance in continuous extraction processes utilizing a tube reactor.

The basic concept of acid or alkaline leaching of uranium from ores is well understood. However, in conventional leaching processes, relatively high amounts of impurities are also dissolved in the leaching solution. Furthermore, in ores such as gold sands, slate, arenaceous quartzes, and silicates, the uranium content is usually below 1% on down to less than 0.1% in low grade ores. A central problem has thus been to devise an economically feasible extraction system capable of processing large amounts of ore continuously with as low as possible a retention time in the system while extracting as high as possible a yield from the ore and with a minimum of impurities.

Extensive work has been done with pressure leaching of uranium-bearing ore in laboratory batch testing. Pilot projects for the continuous processing of ore by pressure leaching have also been undertaken. For example, in one system that has been studied, an ore slurry is cascaded in a series of autoclaves, and steam, oxygen, and sulphuric acid are injected to dissolve the uranium into soluble, hexavalent uranium oxide form which can then be separated from the solids in suspension and refined. However, this type of autoclave system typically requires retention of the slurry for long periods of time of the order of about 60 to 120 minutes in order to achieve the higher yields of 85 to 95% dissolved uranium oxide in the leaching solution.

It is an object of the present invention to provide a method of rapidly and continuously extracting high yields of uranium from ores with a minimum of impurities.

It is another object of the invention to devise a method of extracting high yields of relatively pure uranium through the pressure leaching of ores in a tube reactor system, and to provide such a system which utilizes excess heat in the system and minimizes its impact on the environment.

It is a further object of the invention to specify the optimal parameters and critical operating conditions for a tube reactor system for the continuous, high-yield extraction of a high-purity uranium product from ores.

SUMMARY OF THE INVENTION

With these and other purposes in view, the present invention contemplates an improved method for continuously extracting a uranium product of high yield and purity from refined ores in relatively short processing times comprising the steps of: forming a slurry of ore in a leaching solution; heating the slurry while pumping it through a tube reactor at high turbulences characterized by Reynolds numbers in excess of 50,000; supplying gaseous oxygen at high pressures of at least 30 bar into the slurry such that the uranium is substantially completely oxidized into a soluble form but impurities in the slurry are substantially kept from becoming soluble; and recovering the uranium oxide solute which is substantially free of impurities.

A further aspect of the inventive method includes passing the slurry through a pre-heater section and a reaction section of the tube reactor, and heating the slurry in the pre-heater section for less than five minutes and in the reaction section for about ten minutes or less, whereby the extraction operation is carried out in comparatively short times of less than 15 minutes.

In the optimal processes for practicing the invention, part of the oxygen to be supplied in the oxidation reaction is introduced in the pre-heater section and part in the reaction section. Thus, from one-half to two-thirds of the oxygen is supplied in the pre-heater section and one-half to one-third, respectively, in the reaction section, or, as another alternative, one-third before the pre-heater section, one-third in the pre-heater section, and one-third in the reaction section. Heating in the tube reactor should be maintained at temperatures from about 150° to 200° C., and preferably, the temperatures in the reaction section are maintained at about 170° to 200° C.

Other optimal parameters in the advantageous extraction of uranium according to the present invention include providing a solid matter content in the slurry of about 800 to 1100 grams/liter, a conduit diameter for the slurry of about 10 to 15 centimeters, a flow rate of about 0.5 to 5.0 meters/second and preferably about 2 meters/second, turbulences preferably in Reynolds numbers of one million to two million, and a rate of oxygen supplied in the reaction section of about 3 to 10 cubic meters per ton. In the preferred process, the leaching solution is sulphuric acid, and for pyrite-containing ores the sulphuric acid is formed in situ from an aqueous slurry by oxidation of the sulphur sulphide of the pyrite. The extraction rates attainable with the inventive method are especially high, i.e., about 95% dissolution of the uranium content, at the preferred measures indicated.

A tube reactor adaptable for pressure leaching uranium from ores is discussed for example, in U.S. Pat. No. 3,497,317 to K. Tusche. In the preferred form of the invention, a reactor system includes slurry holding vessels, a diaphragm pump for pumping the suspension of ore solids in the leaching solution under high pressure through a double tube reactor which is heated in successive stages. A pre-heater stage of the tube reactor is heated by heat exchange through a coaxial conduit of the double tube reactor for passing the high temperature reaction outflow in contact therewith. In the high temperature reaction stage, high pressure steam is fed into a similar coaxial conduit to heat that stage to the higher temperatures necessary to achieve as complete an oxidation as possible of the uranium into soluble form. The outflow from the reaction stage passes through a retention stage, of sufficient length for completion of the desired reaction in the slurry, and then flows through the coaxial conduit of the pre-heater stage wherein it exchanges heat to that stage. The outflow product is further cooled and then separated, and the constituents thereof further refined or recycled.

These and other features of the invention and the further advantages therein are explained in greater detail below in conjunction with the drawings of which:

FIG. 1 is a schematic diagram of the pressure leaching method according to the present invention; and FIG. 2 is a schematic diagram of the tube reactor employed in the preferred form of the invention.

DETAILED DESCRIPTION

The extraction of uranium from ores by pressure leaching is understood to involve principally the oxidation of tetravalent uranium by ferric iron, having a valence of three, into hexavalent uranium which is soluble in an acid or alkaline solution. When sulphuric acid is used as a leaching solution, the oxidation reaction may be represented as follows:

$$U^{(IV)}O_2 + Fe^{(III)}_2(SO_4)_3 \rightarrow U^{(VI)}O_2SO_4 + 2Fe^{(II)}SO_4 \quad (1)$$

Tetravalent uranium is also dissolved by oxygen and acid, as follows:

$$U^{(IV)}O_2 + H_2SO_4 + \tfrac{1}{2}O_2 \rightarrow U^{(VI)}O_2SO_4 + H_2O \quad (2)$$

The oxidation with ferric iron (III) in reaction (1) produces ferrous iron, having a valence of two, which is soluble in the sulphuric acid solution. Dissolved ferrous iron (II) is a principal undesirable impurity in the leaching solution, whereas ferric iron (III) in the form of ferric hydroxide is insoluble and is removed from solution, as follows:

$$Fe^{(III)}_2(SO_4)_3 + 6H_2O \rightarrow 2Fe^{(III)}(OH)_3 + 3H_2SO_4 \quad (3)$$

Ferrous iron is also produced by the dissolving in acid of iron from the ore:

$$Fe + H_2SO_4 \rightarrow Fe^{(II)}SO_4 + H_2 \quad (4)$$

It is oxidized into ferric iron by the following reaction:

$$2Fe^{(II)}SO_4 + H_2SO_4 + \tfrac{1}{2}O_2 \rightarrow Fe^{(III)}_2(SO_4)_3 + H_2O \quad (5)$$

It is thus desirable to maximize the presence of ferric iron in relation to ferrous iron in the extraction process in order to ensure the substantially complete oxidation of uranium into soluble hexavalent form and to minimize the ferrous impurity in solution.

These objectives of high uranium dissolution and of minimizing soluble impurities are achieved in the present invention by controlling the introduction of gaseous oxygen in the system and by optimizing the operating conditions in the extraction process. It is discovered in the invention that the desired results are achieved by heating the ore slurry while subjecting it to high turbulences of Reynolds numbers in excess of 50,000 through pumping and by the introduction of gaseous oxygen at high pressures in excess of 30 bar into the slurry in a double tube reactor.

FIG. 1 shows an extraction system according to the present invention schematically. A leaching solution, preferably sulphuric acid, is combined with crushed ore in a slurry tank 10 which is agitated by a high speed stirrer. A slurry pump 11 receives the ore suspension and supplies it at the necessary feed pressure to a diaphragm pump 12. A feed 13 from the slurry pump 11 is recycled to the slurry tank 10 in order to ensure good mixing in the tank.

The diaphragm pump 12 pumps the slurry under high pressure through a tube reactor system, shown on the right-hand side of FIG. 1. The pump 12 has, for example, the capability of handling 3 cubic meters per hour at pressures up to 150 bar. The slurry is pumped through a pre-heater section A and a reaction section B which includes a heater section B1 and a retention section B2. The system is arranged to pass the slurry through the pre-heater section is less than five minutes and through the reaction section in about ten minutes or less, for a processing time of about 15 minutes or less. This pre-heating technique helps to prevent impurities present in the ore from impairing the extraction process.

Gaseous oxygen at stoichiometric ratios necessary for the desired oxidation to hexavalent uranium and minimization of impurities is introduced at selected points of the tube reactor and in specified quantities such that these objectives are optimally achieved. The amount of oxygen must be measured so that under the leaching conditions provided in the invention, the extraction reaction can be carried out completely. Furthermore, care must be taken that impurities in the uranium-containing ore are not extracted, and that they will not interfere in the continuous operation of the extraction process through increasing concentration.

Excellent results are achieved when one-third the required oxygen is put in before the pre-heater section (at C on FIG. 1), one-third in the pre-heater section (at D), and one-third in the reaction section (at E). Alternatively, two thirds can be supplied in the pre-heater section and one-third in the reaction section, or one-half in each section. Furthermore, the oxygen is introduced at very high pressures in excess of 30 bar, preferably about 40 to 80 bar. The rate of oxygen added is in accordance with the stoichiometric ratios required for the oxidation of tetravalent uranium oxide, the maintenance of high ratios of ferric iron to ferrous iron and minimization of other impurities, and the oxidation of any pyritic content of the ore to produce sulphuric acid for the leaching solution. In conjunction with pumping at high pressures, the introduction of gaseous oxygen creates the high turbulence in the reactor, of Reynolds numbers greater than 50,000 and, preferably, of about one million to two million, which is essential to completion of the desired reactions. This distribution of oxygen also ensures that in the critical leaching zones the gaseous oxygen is present in the suspension at the right ratio and that an optimum yield of hexavalent uranium in solution will be achieved. When combined with the specified retention periods in the sections of the tube reactor, the introduction of oxygen at the specified rates further ensures that the impurities in the slurry which are at certain temperatures especially reactive do not become soluble. It has been found that the optimum results are achieved when the rate of oxygen supplied in the reaction section is about 3 to 10 cubic meters per ton of ore, depending upon the stoichiometric relation to the uranium and iron content of the ore.

The extraction process according to the invention can be carried out particularly well in a tube reactor. A preferred form of the reactor system is a double tube reactor such as shown schematically in FIG. 2. The double tube reactor has coaxial conduits including an inner conduit 15 for the slurry suspension fed from the diaphragm pump 12 and outer conduits 16 and 17 for providing heat to the sections of the tube reactor. Conduit 16 provides heat to reaction section B by high pressure steam entering at 18 and exiting at 19. The preferred range of temperatures in the tube reactor for the described extraction process is from about 150° to 200° C. Heating in the reaction section B should be maintained preferably at about 170° to 200° C. The high temperature outflow from the reaction section B of inner conduit 15 is passed through a retention section B2 of specified length sufficient for completion of the desired reactions. From retention section B2, the outflow is passed at point 20 into the outer conduit 17 of pre-heater section A. Heat from the high temperature outflow is transferred to heat the slurry in inner conduit 15 to a temperature of about 150° to 170° C. Thus, the excess heat of the reaction outflow can be utilized while also resulting in cooling down the outflow product.

The inner conduit has a preferred diameter of about 10 to 15 centimeters at which a desired volume to flow relation is achieved for the conditions of the extraction process. In the tube reactor, it is also found that the flow conditions required by the invention are reached at a flow velocity of about 0.5 to 5.0 meters per second, and are especially advantageous at a median flow velocity of about 2 meters per second. With the preferred values a degree of turbulence is prevalent which is characterized by Reynolds numbers between one million and two million. The leaching result of dissolved hexavalent uranium will then be improved to about 95%, representing an improvement of about 5% over other turbulence levels. The process according to the invention can be carried out especially favorably as a cycle or continuous process wherein the acidity content of the solution is being repeatedly reused. The suggested process is therefore in harmony with ecological considerations.

In the preferred practice of the invention, the ore content in the aqueous solution is maintained at about 800 to 1100 grams per liter. An acid such as sulphuric acid with a concentration of 0 to 15 grams per liter may be used, depending upon the pyrite content of the ore. In pyrite-containing ore, sulphuric acid is produced in an oxidation reaction of pyrite in an aqueous solution, as follows:

$$2FeS_2 + 7O_2 + 2H_2O \rightarrow 2FeSO_4 + 2H_2SO_4. \quad (6)$$

If pyrite is present in the ore, the sulphuric acid introduced may be dilute or minimal since the requisite acidic content can be generated through the oxidation of pyrite. In reactions involving a minimum of pyrite and a substantial content of tetravalent uranium, the preferred range of sulphuric acid is approximately 3 grams per liter measured in the reactor before reaction. The structural material of the reactor system should be suitable for the type of leaching solution used; for example, with sulphuric acid titanium material may be used.

Other mineral acids such as hydrochloric (HCl) or nitric (HNO$_3$) acid can be used. However, such leaching solutions usually cause corrosion problems within the reactor system. Alkaline materials such as ammonium, carbonate, and sodium bicarbonate compounds can also be employed. The invention is not limited to any particular type of ore and is especially useful in the continuous processing of low grade ores. However, the use of acid consuming ores is considered to be uneconomical.

In the continuous processing of the tube reactor system, a slurry tank 21 is provided for holding the pressure leached suspension product from the reactor system. Solid matter or insoluble matter is separated from the solute uranium product in a further separation processing stage, and the sulphuric acid is recycled for reuse in the reactor system, as shown at the left-hand side of FIG. 1. The separation, filtration, and washing of the suspension products is carried out as is known conventionally.

As an illustrative example of the extraction process according to the invention, a reactor system was constructed having a pre-heater section 182 meters long, a heater zone of the reactor section of 138 meters, and a retention pipe of 272 meters. Retention time for the slurry in the reactor was 1.03 minutes in the pre-heater section, 0.78 minutes in the reaction heater, 3.83 minutes in the retention pipe, for a total reaction time of about 5.7 minutes.

In a similar reactor arrangement, ore having the composition specified below was leached in comparative tests producing the measurements shown:

| Starting Ore | | | |
|---|---|---|---|
| Sieve Analysis: | >90μ | | = 27% |
| | 90 – 45μ | | = 31% |
| | <45μ | | = 42% |
| Specific Weights: | 2.74 g/cm$^3$ | | |
| Chemical Analysis: | U$_3$O$_8$ | | = 140 ppm |
| | SiO$_2$ | | = 88.0% |
| | Fe$_2$O$_3$ | | = 4.0% |
| | Al$_2$O$_3$ | | = 1.7% |
| | CaO + MgO | | = 0.5% |
| | S – gesamt | | = 2.1% |
| | Glühverlust | | = 2.5% |

| | Test No. | | |
|---|---|---|---|
| Test Parameters and Results | 1 | 2 | 3 |
| Suspension Density (gm ore/l) | 850 | 950 | 1,050 |
| Throughput Reactor (m$^3$/h) | 3 | 3 | 2.3 |
| Temperatures (°C.) - | | | |
| Preheating Zone | 150 | 170 | 130 |
| Reaction Zone | 180 | 200 | 160 |
| Partial Pressure O$_2$ (bar) | 80 | 80 | 40 |
| Amount of O$_2$ (m$^3$/ton ore) | 8 | 5 | 10 |
| Duration (min.) - | | | |
| Pre-heating Zone | 1 | 1 | 2.5 |
| Reaction Zone | 4 | 4 | 10 |
| Amount of H$_2$SO$_4$ in Solution (gm/l): | | | |
| Before Reaction | 2.4 | — | 2.0 |
| After Reaction | 10.2 | 8.1 | 14.7 |
| Ferrous Iron in Extraction Leach (gm/l) | 0.9 | 2.7 | 0.5 |
| Undissolved Uranium Residue (ppm) | 8 | 15 | 10 |
| Uranium Solute Yield (%) | 95 | 89 | 93 |

High yields of dissolved uranium in short processing times and with low amounts of ferrous impurity are thus achieved according to the optimal parameters specified for the extraction process of the invention. It will be understood that the foregoing description of the preferred method of the present invention is for purposes of illustration only, and that the various parameters and operating values disclosed herein may be modified in a number of ways obvious to one skilled in the art, none of which entail any departure from the spirit and scope of the invention as defined in the appended claims.

I claim:

1. A method for continuously extracting uranium from ores comprising the steps of:
   forming a slurry of ore in a leaching solution;
   heating and agitating the slurry by pumping it at high pressure and high velocity through a heated tube reactor while supplying gaseous oxygen at pressures of at least 30 bar at selected locations along the reactor, the velocity of said slurry through said tube reactor and the pressure of said oxygen being selected in relation to the diameter of said tube reactor and the density and viscosity of said slurry to achieve turbulent flow of said slurry in said reactor with Reynolds numbers in excess of 50,000, the velocity of said slurry being such relative to the length of the tube reactor that the retention time of the slurry in the reactor is less than about 15 minutes yet the uranium is substantially completely oxidized to a soluble form of uranium oxide but impurities in the slurry are substantially kept from becoming soluble; and recovering the uranium oxide solute which is substantially free of impurities.

2. The method of claim 1 wherein the tube reactor includes a pre-heater section and reactor section, and wherein the velocity of said slurry is selected such that the retention time in the pre-heater section is less than 5 minutes at a temperature between about 150° and 200° C. and the retention time in the reaction section is approximately 10 minutes or less at a temperature between about 170° and 200° C. and where said Reynolds number is between about one million to two million.

3. The method of claim 2 wherein one half of the oxygen to be supplied is introduced in the pre-heater section and one half in the reaction section.

4. The method claim 2 wherein one third of the oxygen to be supplied is introduced before the pre-heater section, one third in the pre-heater section, and one third in the reaction section.

5. The method of claim 2 wherein two thirds of the oxygen to be supplied is introduced in the pre-heater section and one third in the reaction section.

6. The method of claim 2 wherein the reaction section is heated to a higher temperature than the pre-heater section, and the pre-heater section is heated by transferring heat from an outflow from the reaction section to the pre-heater section.

7. The method of claim 2 wherein said oxygen is supplied in the reaction section at a rate of 3 to 10 cubic meters per ton.

8. The method of claim 1 further comprising the step of recovering the leaching solution from the pressure leached suspension for reuse thereafter.

9. The method of claim 1 wherein the slurry has a solid matter content in suspension of about 800 to 1100 grams/liter.

10. The method of claim 1 wherein the slurry is pumped through a conduit of the tube reactor having a diameter of 10 to 15 centimeters, the slurry having a flow rate through the conduit of about 0.5 to 5.0 meters/second.

11. The method of claim 1 wherein the leaching solution is sulphuric acid.

12. The method of claim 1 for continuously extracting uranium from pyrite-containing ores wherein the leaching solution is formed from an aqueous slurry by oxidation of the pyrite.

13. A method for continuously extracting uranium from ores comprising the steps of:

forming a slurry of ore in an acid leaching solution having a solid matter content in suspension between 800 to 1100 grams/liter;

heating the slurry to a temperature from 150° to 180° C. while pumping it through a heated tube reactor having a pre-heater section and a reaction section at a velocity between 0.5 and 5 m/sec, said tube reactor having a diameter between 10 and 15 centimeters, supplying gaseous oxygen into the slurry at high pressures of at least 30 bar in an amount and at a location in the tube reactor causing turbulent flow of the slurry in the tube reactor with Reynolds numbers in excess of 1,000,000, and causing the uranium to be substantially completely oxidized into a soluble, hexavalent uranium oxide form while impurities in the slurry are substantially kept from becoming soluble in the leaching solution;

said heating step comprising passing the slurry through said pre-heater section for less than 5 minutes and through said reaction section for approximately 10 minutes or less, said oxygen supplying step including introducing part of the total oxygen to be supplied in the pre-heater section and another part in the reaction section, the reaction section being at a higher temperature than the pre-heater section and the pre-heater section being heated by transferring heat from the outlet of the reaction section to the pre-heater section; and recovering the uranium oxide solute which is substantially free of impurities.

14. The method of claim 13 further comprising recovering the leaching solution from the pressure leached suspension for reuse thereafter.

* * * * *